United States Patent
Padmanabhan et al.

(10) Patent No.: US 10,454,619 B2
(45) Date of Patent: Oct. 22, 2019

(54) ADVANCED RETRY MECHANISM FOR TRANSMITTING LARGE DATASETS

(71) Applicant: Microsoft Technology Licensing, LLC, Redmond, WA (US)

(72) Inventors: Mohan Padmanabhan, Sammamish, WA (US); Mayukh Ray, Vancouver (CA); Aditya Kekatpure, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 282 days.

(21) Appl. No.: 15/346,352

(22) Filed: Nov. 8, 2016

(65) Prior Publication Data

US 2018/0131470 A1    May 10, 2018

(51) Int. Cl.
*H04L 1/08* (2006.01)
*G06F 3/06* (2006.01)
*G06F 11/14* (2006.01)

(52) U.S. Cl.
CPC ............. *H04L 1/08* (2013.01); *G06F 3/067* (2013.01); *G06F 3/0619* (2013.01); *G06F 3/0644* (2013.01); *G06F 3/0647* (2013.01); *G06F 3/0661* (2013.01); *G06F 11/1443* (2013.01); *G06F 11/14* (2013.01); *G06F 11/1402* (2013.01)

(58) Field of Classification Search
CPC ....... H04L 1/08; G06F 3/0619; G06F 3/0644; G06F 3/0647; G06F 3/0661; G06F 3/067; G06F 11/14; G06F 11/1402; G06F 11/1443
See application file for complete search history.

(56) References Cited

U.S. PATENT DOCUMENTS

| 8,544,075 B2 | 9/2013 | Ranjan et al. |
| 2011/0271145 A1* | 11/2011 | Silberstein .......... G06F 11/1443 714/18 |
| 2011/0276821 A1 | 11/2011 | Gudlavenkatasiva et al. |
| 2013/0074079 A1 | 3/2013 | Clark et al. |
| 2014/0222843 A1 | 8/2014 | Sareen et al. |

(Continued)

OTHER PUBLICATIONS

Qiao, et al., "Gobblin: Unifying Data Ingestion for Hadoop", In Proceedings of the VLDB Endowment, vol. 8, No. 12, Aug. 2015, pp. 1764-1769.

(Continued)

*Primary Examiner* — Christian M Dorman (57) ABSTRACT

In non-limiting examples of the present disclosure, systems, methods and devices for transmitting data stored in a source data store to a destination data store are presented. A plurality of data chunks may be received in a first format. At least one upsert operation may be performed on each of the data chunks for converting the first format to a format compatible with a destination data store schema. A transfer of the upserted data chunks to the destination data store may be executed. A determination may be made that at least one of the upserted data chunks has failed to transfer to the destination data store. Failed data chunks may be stored in a failed chunk retry data store. The at least one upsert operation may be re-performed on failed data chunks and a re-execution of the transfer of failed data chunks to the destination data store may be made.

20 Claims, 8 Drawing Sheets

(56) References Cited

U.S. PATENT DOCUMENTS

| | | | |
|---|---|---|---|
| 2014/0289539 A1 | 9/2014 | Osterwalder et al. | |
| 2015/0149814 A1 | 5/2015 | Ren et al. | |
| 2016/0191509 A1 | 6/2016 | Bestler et al. | |
| 2016/0321307 A1* | 11/2016 | Dingman | G06F 3/048 |
| 2016/0350530 A1* | 12/2016 | Wang | G06F 12/1441 |

OTHER PUBLICATIONS

Silberstein, et al., "A Batch of PNUTS: Experiences Connecting Cloud Batch and Serving Systems", In Proceedings of the ACM SIGMOD International Conference on Management of data, Jun. 12, 2011, pp. 1101-1112.

Li, et al., "eScience in the Cloud: A MODIS Satellite Data Reprojection and Reduction Pipeline in the Windows Azure Platform", In Proceedings of IEEE International Symposium on Parallel & Distributed Processing, Apr. 19, 2010, 12 pages.

Subedi, et al., "CoARC: Co-operative, Aggressive Recovery and Caching for Failures in Erasure Coded Hadoop", In Proceedings of 45th International Conference on Parallel Processing, Aug. 16, 2016, pp. 288-293.

Akidau, et al., "MillWheel: Fault-Tolerant Stream Processing at Internet Scale", In Proceedings of the VLDB Endowment, vol. 6, No. 11, Aug. 26, 2013, 12 pages.

Jiang, et al., "epiC: an extensible and scalable system for processing Big Data", In Proceedings of the VLDB Endowment, vol. 7, Issue 7, Mar. 2014, pp. 3-26.

Tan, et al., "Diff-Index: Differentiated Index in Distributed Log-Structured Data Stores", In Proceedings of 17th International Conference on Extending Database Technology, Mar. 24, 2014, 12 pages.

Gupta, et al., "Mesa: Geo-Replicated, Near Real-Time, Scalable Data Warehousing", In Proceedings of the VLDB Endowment, vol. 7, No. 12, Sep. 1, 2014, 12 pages.

Law, et al., "A Multi-Threaded Streaming Pipeline Architecture for Large Structured Data Sets", In Proceedings of the conference on Visualization, Oct. 24, 1999, 8 pages.

"International Search Report and Written Opinion Issued in PCT Application No. PCT/US2017/059813", dated Jan. 24, 2018, 13 Pages.

* cited by examiner

ADVANCED RETRY MECHANISM FOR TRANSMITTING LARGE DATASETS

BACKGROUND

Large data collection by data providers (e.g., telecom resource providers), such as call record data collection, is generally accomplished by storing compiled records (e.g. call records) large datasets. Individual records and their representative datasets are generally stored with little regard for their downstream use and the various schemas that would be useful in processing such data by the data providers and the downstream accessors of that data. To convert and store such datasets into useful information it is helpful to perform various data reformatting operations on the originally stored data. The process of reformatting, transferring and storing datasets often leads to errors that result in incomplete transfer of records or complete data transfer failure altogether.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for transmitting data from a source data store, comprising: receiving a plurality of data chunks, the plurality of data chunks received in a first format; performing at least one upsert operation on each of the plurality of data chunks, the at least one upsert operation comprising converting the first format to a schema compatible with a destination data store; executing a transfer of the upserted data chunks to the destination data store; determining that at least one of the upserted data chunks has failed to transfer to the destination data store; storing the at least one failed data chunk in a failed chunk retry data store; re-performing the at least one upsert operation on the at least one failed data chunk; and re-executing a transfer of the at least one failed data chunk to the destination data store.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for transferring datasets stored in a first format in a source data store to a destination data store requiring a different format. The systems, methods and devices described herein may be utilized in the transfer of data, from a source data store, that is stored in non-structured, semi-structured and/or structured formats to a destination data store that requires the storage of data in a specified schema. According to a specific example, call records received from a telecommunication company, which are typically stored in a semi-structured format (i.e., data that does not conform with the formal structure of data models associated with relational databases or other forms of data tables, but nonetheless contains tags or other markers to separate semantic elements and enforce hierarchies of records and fields within the data), may be stored in a source data store and transferred to a destination data store after performing one or more format-modifying operations on the semi-structured data such that it meets a specified schema of the destination data store.

As used herein, the term "dataset" describes a finite collection of data records, "data record" describes a single line within a dataset, and "data chunk" describes a memory fragment of a dataset whose size is determined via one or more mechanisms as more fully described below. Aspects provide mechanisms for periodically determining whether datasets in a source data store should be extracted for transfer to a destination data store, splitting datasets stored in a source data store into data chunks, extracting the data chunks from the source data store, performing one or more upsert operations on each data chunk and transferring the upserted data chunks to a destination data source.

According to examples a dataset may comprise a large number of records. Such datasets may typically be gigabytes if not terabytes in size. According to an example, such datasets may be split into individual data chunks of a configurable finite set size. These individual chunks that are created are of fixed size and may comprise incomplete records. According to additional examples the size of a data chunk may be determined based on the computing resources available for a dataset transfer. For example, if computing resources are abundant, a higher number of resources for executing mapping operations may be capable of being run simultaneously than would otherwise be the case for a system that has strained or otherwise limited computing resources available for a dataset transfer.

A data chunk may fail to be successfully transferred to a destination data store for various reasons. As an example, one or more records included in a data chunk may fail to be properly upserted by a mapper or mapping engine during the transfer process to a destination data store due to network weather. As used herein, an upsert operation describes any operation involved in modifying the format of data stored in a source data store such that it may be successfully be transferred to a destination data store requiring a second data format. For example, an upsert operation as used herein may comprise insertion of a row, or on the basis of a row already existing, updating the existing row. According to the systems and methods described herein, an upsert is only applicable to the complete records present in a dataset. All incomplete records are ignored and flushed as a residue by one or more residue flushing engines. When individual mappers or mapping engines process these separate data chunks, the incomplete records are reconciled by a reducer task during processing/cooking. All data chunks that are identified as having an error while uperting are marked as "failed chunk." In performing the reducer task (e.g., when one or more records are incomplete), all residues are marked as failed and those failed records are treated as another failed data chunk in a failed chunk container.

Additional aspects of the present disclosure provide advanced retry mechanisms for data chunks that have failed to successfully transfer to a destination data store requiring a specific schema. Specifically, a parallel process is provided whereby successfully transferred data chunks are immediately accessible in the destination data store upon their successful transfer while the advanced retry mechanisms described herein operate simultaneously on failed data chunks. The advanced retry mechanisms include transferring failed data chunks to a failed chunk retry data store, periodically extracting failed data chunks from the failed chunk retry data store according to a back-off retry attempt threshold, re-performing one or more upsert operations on the extracted data chunks, and reattempting a transfer of the upserted data chunks to the destination data store. As such, lossless data transfer from a source data store to a destination data store may be accomplished even in the case of one or more data chunks failing to successfully transfer to the destination data store, while access is simultaneously provided during failed data chunk retry, to data chunks that were initially or subsequently successfully transferred to the destination data store.

Mechanisms for executing the chunking of datasets from a source data store, processing of those data chunks for transfer to a destination data store and retry of data chunks that fail to transfer to a destination data store may be implemented according to the following examples.

Example—Segment Creation and Instant Processing:

1. Dataset X1 is segmented into data chunks of x11, x12, x13 . . . xN. These data chunks are segmented by memory-strictness (e.g., 1 MB even if the segmentation occurs in the middle of a record) as opposed to data strictness.

2. Create a notification for the creation of a batch job with n tasks.

3. For each data chunk: (a) tag each data chunk with Task Id. x11 . . . txN; (b) upload tagged data chunks to a persistent storage and create a notification once upload completes.

4. Repeat step 3 above for 1 . . . N data chunks.

5. Repeat steps 1-4 for datasets X2 . . . Xn.

Example—Master Batch Job:

1. Receive job creation notification and initiate batch job→X1J.

2. Create empty task for tx11 data chunk: (a) tx11 wait for notification that x11 data chunk upload is completed; (b) once notification is received, start processing the data chunk; (c) residue records (not completed due to chunking) are moved to X1J-rx11 file in residue container; (d) all failed records are moved to X1J-fx11 file in failed container with metadata (e.g., metadata indicating RetryCount number, FileName, FailedRecordsCount, etc.); (e) delete x11 data chunk.

3. Repeat step 2 until xN data chunk has been successfully transferred.

4. Create task txN+1: (a) stitch all residues (X1J-rx11, X1J-rx12, X1J-rx13 . . . X1J-rxN from residue container; (b) process the data chunk; (c) move all failed records to X1J-fxN+1 file in failed container; (d) delete X1J-rx11, X1J-rx12, X1J-rx13 . . . X1J-rxN; (e) if there are no failed records, mark X1 as "SUCCESS" or as "PARTIAL SUCCESS" if there are one or more failed records.

Example—Retry Batch (Scheduled Independently):

Assuming: (a) X1 produces failed data chunks X1J-fx11, X1J-fx13, X1J-fx15; (b) X2 produces failed data chunks X2J-fx21, X2J-fx23; (c) Xn produces failed data chunks XnJ-fxn1:

1. Scan failed container.

2. Create task for X1J-fx11 (a) process the data chunk; (b) FailedRecordsCount is saved as metadata of X1J-fx11 file; (c) retrieve retry count from metdata and update with RetryCount+1.

3. Repeat step 2 for X1J-fx13 . . . XnJ-fxn1.

4. Create task for post processing: (a) get all failed data chunks for X1; (b) If Sum(FailedRecordsCount)=0, delete all failed data chunks and mark X1 file as "SUCCESS"; (c) if RetryCount=Configurable MaxRetry, delete the data chunk; (d) repeat substep (a) for X2 . . . Xn.

According to some aspects a data chunk that has failed to successfully transfer to a destination data store may be transferred back to the failed chunk retry data store and the process of retrying transfer of such repeatedly failed data chunks to the destination data store as described above may be repeated one or more times based on a linearly scaled, exponentially scaled, or non-scaled back-off attempt threshold.

If a linearly scaled back-off attempt threshold is utilized, retry of failed data chunks would occur at regular temporal intervals. That is, according to a linearly scaled back-off attempt threshold, a first retry would occur after X seconds, minutes, hours or days, and if the failed data chunk fails to transfer a second time a second retry would occur after X seconds, minutes, hours or days, and so on until either the failed data chunk is successfully transferred to a destination data store or a threshold number of retry transfer attempts has occurred. Upon reaching the threshold number of transfer attempts and still unsuccessfully being transferred to the destination data store the repeatedly failed data chunk may be sent to a permanently failed container such that no additional attempts to transfer the data chunk are be made. According to a more specific example, a first retry may occur five seconds after a data chunk fails to initially transfer successfully to a destination data store, if the failed data chunk fails to transfer during a first retry a second retry may occur five seconds after the data chunk fails to transfer successfully to the destination data store during the first retry, if the failed data chunk fails to transfer during the second retry a third retry may occur five seconds after the data chunk fails to transfer during the second retry, and so on until either the failed data chunk is successfully transferred to a destination data store or a threshold number of retry transfer attempts has occurred.

In the case of an exponentially scaled back-off attempt threshold being utilized, retry of failed data chunks would occur at exponentially scaled temporal intervals. That is, a first retry would occur after X seconds, minutes, hours or days and if the failed data chunk fails to transfer a second time a second retry would occur after Y seconds (Y being an exponential function of X), minutes, hours or days, and so on until either a failed data chunk is successfully transferred to a destination data store or a threshold number of retry transfer attempts has occurred. According to a more specific example, a first retry may occur 5 seconds after a data chunk fails to initially transfer successfully to a destination data store, if the failed data chunk fails to transfer during a first retry a second retry may occur 25 seconds after the data chunk fails to transfer successfully to the destination data store during the first retry, if the failed data chunk fails to transfer during a second retry a third retry may occur several minutes after the data chunk fails to transfer during the second retry, and so on until either the failed data chunk is successfully transferred to a destination data store or a threshold number of retry transfer attempts has occurred.

In the case of a non-scaled back-off attempt threshold being utilized, retry of failed data chunks would occur at various determined temporal intervals. That is, rather than retrying failed data chunks on linear or exponential temporal scales, transfer retries may be executed at non-scaled intervals as determined by one or more non-scaled interval engines. Such engines may provide non-scaled intervals for retrying failed data chunks based on computer learning to determine timespans between successive retries that are likely to be successful, determining that received data associated with a destination data store indicates that the destination data store is in one or more states which are indicative of the destination data store being able to accommodate transfer data or transfer data of a specific format, determining that received data associated with a destination data store indicates that a destination data store is in one or more states which are indicative of the destination data store being unable to accommodate transfer of data or transfer data of a specific format, etc. Furthermore non-scaled interval engines may determine random temporal criteria for retrying one or more data chunk for transfer to a destination data store.

According to examples a separate engine or set of engines (e.g., extraction engines, mapping engines, upsert engines, encryption and decryption engines) is assigned to each data chunk of a dataset that is to be transferred from a source data store to a destination data store. Thus, metadata may be associated with each data chunk indicating which specific engines were assigned to it during transfer. This metadata may indicate to an administrator of a dataset transfer that one or more of the engines in a data transfer system is likely responsible for transfer errors if metadata from multiple failed data chunks from multiple dataset transfer cycles indicate that they were handled by one or more of the same engines. Additionally, metadata may be associated with failed data chunks indicating a number of times that a transfer to a destination data store has been tried for a data chunk. Such metadata may be utilized in determining whether to perform a subsequent retry transfer attempt of a data chunk based on a back-off retry attempt threshold, and if the data chunk has not exceeded the back-off retry attempt threshold, the metadata may provide a mechanism for determining how long to wait to retry a transfer of the data chunk to the destination data store based on a linear or exponential temporal scale defined by the back-off retry attempt threshold.

Data chunks and/or individual records included in a data chunk may be encrypted and decrypted in one or more cycles during the transfer of a data chunk from a source data store to a destination data store. For example, a data chunk may be encrypted or decrypted upon being extracted from a source data store, upon transfer of a data chunk to a destination data store, upon transfer of a failed data chunk to a failed chunk retry data store, upon extraction of a failed data chunk from a failed chunk retry data store, and upon transfer of a failed data chunk to a permanently failed container. According to other examples a data chunk and/or individual records included in a data chunk may be encrypted when at rest and in transit and the data chunk and/or individual records included in the data chunk may only be decrypted at a transfer boundary (e.g., at the boundary of the source data store, the boundary of the destination data store, the boundary of a failed chunk retry data store).

According to examples, during the transfer of a dataset to a destination data store, separate engines for performing encryption and decryption operations may be assigned to each of the data chunks comprising the dataset. Thus, unlike typical large data transfer methods that employ a single service for encrypting and decrypting a dataset, which can sometimes take days for large datasets and often leads to dropped records, assigning separate engines to each data chunk for encryption and decryption operations significantly increases the efficiency of a data transfer and decreases the amount of time needed to transfer datasets. Further, because a data chunk transfer failure due to one or more miswrite by an engine assigned to a data chunk only affects that data chunk, successfully transferred data chunks are immediately accessible at a destination data store while the failed data chunks can simultaneously be retried according to the aspects described herein.

Figure 1:
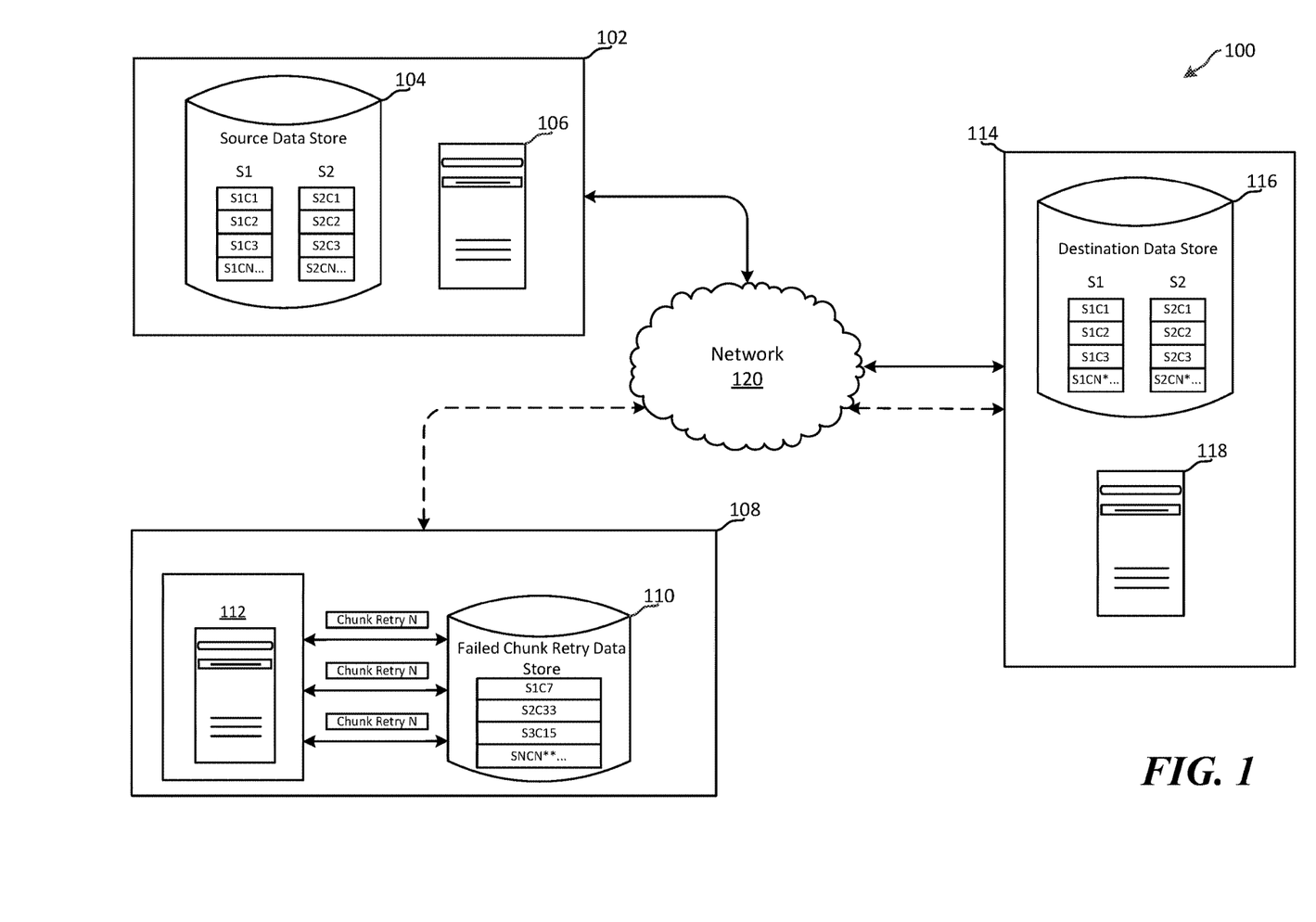
FIG. 1 is a schematic diagram illustrating an example distributed computing environment for providing advanced retry mechanisms for transfer of large datasets.

FIG. 1 is a schematic diagram illustrating an example distributed computing environment 100 for providing advanced retry mechanisms for transfer of large datasets. Computing environment 100 includes source dataset context 102, destination dataset context 114, data chunk retry context 108 and network 120. Original dataset context 102 includes source data store 104 and one or more computing devices such as server computing device 106. Large datasets, such as audio and video call log files, may be stored in source data store 104. According to examples such large datasets may comprise multiple files stored in various formats. Server computing device 106 may perform various operations related to datasets stored in source data store 104 utilizing one or more modules and/or engines such as a trigger engine for periodically analyzing datasets 104 and splitting datasets (such as dataset S1 and dataset S2) into data chunks, such as data chunks S1C1, S1C2, S1C3 and S2CN, S2C2, S2C3 and S2CN shown in source data store 104. Additional operations that may be performed by server computing device 106 include extracting data chunks from source data store 104 for transfer, encrypting and decrypting data chunks and/or individual files included in data chunks, determining format requirements of a destination data store such as destination data store 116, as well as performing one or more upsert operation on data chunks and their corresponding data records.

Upon extraction of one or more data chunks comprising a split dataset (e.g., data chunks S1C1, S1C2, S1C3, S1CN, S2C1, S2C2, S2C3 and S2CN), server computing device 106 may assign a separate mapping engine to each of the extracted data chunks for performing one or more upsert operations for modifying the format of each of the extracted data chunks to a specific schema format supported by a destination data store such as destination data store 116. Upon performance of the upsert operations on each of the data chunks, a first attempt may be made to transfer each of data chunks, via network 120, to destination data store 116. According to this example one or more operations may be performed by one or more computing devices, such as server computing device 118, prior to and/or during transfer of data chunks to the destination data store 116. For example, server computing device 118 may encrypt or decrypt one or more data chunks being transferred to destination data store 116. Server computing device 118 may also inspect each data chunk being transferred to ensure that the format of files contained therein complies with a structured format supported by destination data store 116.

As shown in FIG. 1, a first attempt has been made to transfer each data chunk from dataset 1 (i.e., S1C1, S1C2, S1C3 and S1CN) and dataset 2 (i.e., S2C1, S2C2, S2C3 and S2CN) from source data store 104 to destination data store 116. Upon the first transfer attempt only data chunks S1C1, S1C2, S1C3, S1CN*, S2C1, S2C2, S2C3 and S2CN* were successfully transferred to destination data store 116. According to the systems and methods described herein the data chunks that failed to successfully transfer to destination data store 116 are transferred, via network 120, to a failed chunk retry data store such as failed chunk retry data store 110. Thus, in this example failed data S1C7, S2C33, S3C15 and SNCN** have been transferred and stored in failed chunk retry data store 110. According to an additional aspects, rather than transferring data chunks that failed to transfer to a failed chunk retry data store such as failed chunk retry data store 110, those data failed chunks may be marked as failed within a the source data store 104 and subsequent transfer retries of those failed data chunks to the destination data store 116 may be executed directly from source data store 104. One or more computing devices such as server computing device 112 may encrypt or decrypt one or more failed data chunks and/or individual files included in one or more failed data chunks.

According to examples, after failed data chunks from a split transfer dataset have been stored in failed chunk retry data store 110 (or alternatively failed data chunks have been marked as failed in source data store 104) one or more additional periodic attempts may be made to transfer the failed data chunks to destination data store 116. For example, one or more operations may be performed by server computing device on failed chunks S1C7, S2C33, S3C15 and SNCN** for a second transfer attempt. Such operations may include encrypting and/or decrypting failed data chunks, extracting failed data chunks from failed data chunk storage 110 (or alternatively failed data chunks in source data store 104 that have been marked as failed), and re-performing one or more upsert operations on failed data chunks for a second attempt at transferring failed data chunks to destination data store 116. According to examples, server computing device may assign separate engines to each failed data chunk for the operations described above. Server computing device 112 may also make a determination as to how many times a failed data chunk has failed to transfer to destination data store 116, and based on that determination and a back-off retry attempt threshold, how long to wait between retry attempts and/or whether to transfer a failed data chunk to a permanently failed container based on a determination that a failed data chunk has exceeded a back-off retry attempt threshold number (e.g., 1 attempt, 2 attempts, 3 attempts, 4 attempts, 5 attempts).

Figure 2:
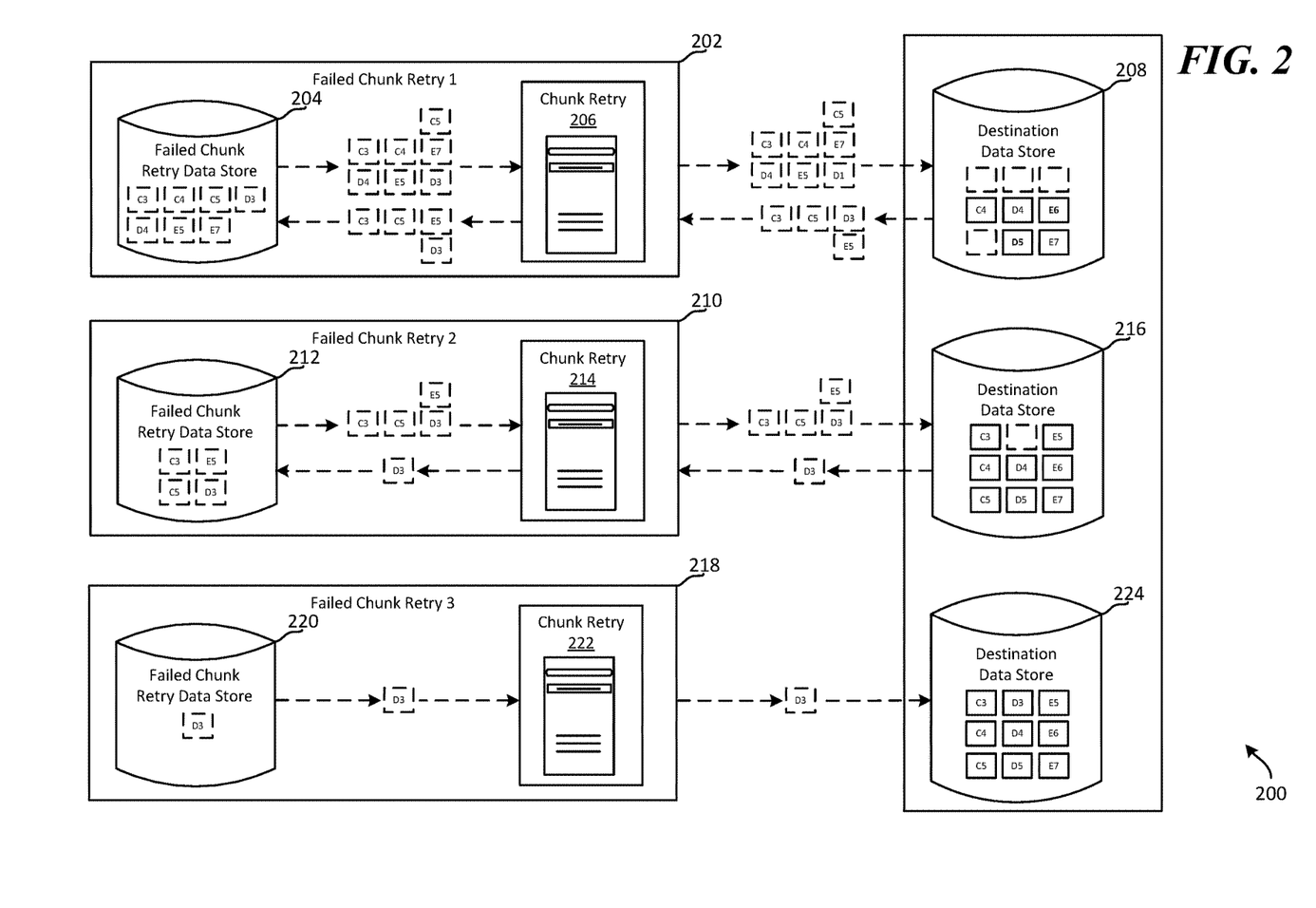
FIG. 2 is a schematic diagram illustrating an exemplary failed data transfer retry mechanism utilizing a back-off retry scheme.

FIG. 2 is a schematic diagram 200 illustrating an exemplary failed data transfer retry mechanism utilizing a back-off retry scheme. Although the depicted data transfer retry mechanism shown in FIG. 2 depicts completion of a dataset transfer after three retry attempts, completion of a dataset transfer may be accomplished according to the aspects described herein by retrying one or more failed data chunks of a dataset, one, two, three, or N number of times. Further, a successful data transfer of a dataset may not require use of a data transfer retry mechanism as illustrated by FIG. 2 should a successful transfer of each data chunk of a dataset be accomplished successfully upon an initial data chunk transfer attempt of all data chunks from a source data store to a destination data store.

Schematic diagram 200 includes first data chunk retry context 202 having failed chunk retry data store 204 in which data chunks that failed to transfer to a destination data store, such as destination data store 208, during a first transfer attempt are stored. According to this example each of failed data chunks C3, C4, C5, D3, D4, E5 and E7 failed to transfer to destination data store 208 during an initial transfer attempt, while data chunks E6 and D5 (shown in destination data store 208 in bold) were successfully transferred during an initial data chunk transfer attempt from a source data store to destination data store 208. As such, in accordance with the systems and methods described herein, a first retry attempt to transfer each of failed data chunks C3, C4, C5, D3, D4, E5 and E7 to destination data store 208 is made. As illustrated in FIG. 2, data chunks having a "CN" designation such as data chunks C3, C4 and C5 have been divided from a first dataset, data chunks having a "DN" designation such as data chunks D3, D4 and D5 have been divided from a second dataset, and data chunks having an "EN" designation such as data chunks E5, E6 and E7 have been divided from a third dataset.

Prior to the first retry attempt one or more computing devices such as server computing device 206 may perform one or more operations on each of data chunks C3, C4, C5, D3, D4, E5 and E7 such as encryption and decryption operations, extraction operations and upsert operations. Server computing device 206 may assign a separate engine or module to each of failed data chunks C5, D3, D4, E5 and E7 in performing such operations. As shown in FIG. 2, only initially failed data chunks C4, D4 and E7 are successfully transferred to destination data store 208 during a first transfer retry attempt. Once successfully transferred to destination data store 208, those data chunks and the records included therein are immediately made accessible, while simultaneous retry attempts can be made on the remaining failed data chunks. Accordingly, each of failed data chunks C3, C5, D3 and E5 are transferred back to failed chunk retry data store 204 (referred to as failed chunk retry data store 212 during a second transfer retry attempt and failed chunk retry data store 220 during a third transfer retry attempt). Although reference is made to "failed chunk retry data store" with regard to FIG. 2, according to aspects of the disclosure failed data chunks may simply be marked as failed within the source data store and transfer of those failed data chunks to a destination data store may be retried therefrom.

Schematic diagram 200 includes second data chunk retry context 210 having failed chunk retry data store 212 in which data chunks that failed to transfer to a destination data store, such as destination data stores 208, 216 and 216, during a first transfer attempt and a subsequent first retry transfer attempt, are stored. Thus, according to this example, each of failed data chunks C3, C5, D3 and E5 failed to transfer to destination data store 216 during an initial transfer attempt and a subsequent first retry attempt. As such, in accordance with the systems and methods described herein, a second retry attempt to transfer each of failed data chunks C3, C5, D3 and E5 to destination data store 216 is made.

Prior to the second retry attempt one or more computing devices such as server computing device 214 may perform one or more operations on each of data chunks C3, C5, D3 and E5 such as encryption and decryption operations, extraction operations and upsert operations. Server computing device 214 may assign a separate engine or module to each of failed data chunks C3, C5, D3 and E5 in performing such operations. As shown in FIG. 2, only failed data chunks C3, C5 and E5 are successfully transferred to destination data store 216 during a second transfer retry attempt. Once successfully transferred to destination data store 216, those data chunks and the records included therein are immediately made accessible, while simultaneous retry attempts can be made on the remaining failed data chunks. Accordingly, remaining failed data chunk D3 is transferred back to failed chunk retry data store 212 (referred to as failed chunk retry data store 220 during a third transfer retry attempt).

Schematic diagram 200 includes third data chunk retry context 218 having failed chunk retry data store 224 in which data chunks that failed to transfer to a destination data store, such as destination data store 208, 216 and 216, during a first transfer attempt and subsequent first and second retry transfer attempts, are stored. Thus, according to this example, failed data chunk D3 failed to transfer to destination data store 224 during an initial transfer attempt and subsequent first and second retry attempts. As such, in accordance with the systems and methods described herein, a third retry attempt to transfer failed data chunk D3 to destination data store 224 is made.

Prior to the third retry attempt one or more computing devices such as server computing device 222 may perform one or more operations on failed data chunk D3 such as encryption and decryption operations, extraction operations and upsert operations. As shown in FIG. 2, failed data chunk D3 is successfully transferred to destination data store 224 during a third transfer retry attempt. Once successfully transferred to elastic job store 224 successful transfer of each of data chunks C3, C4, C5, D3, D4, D5, E5, E6 and E7 has been accomplished.

Figure 3A:
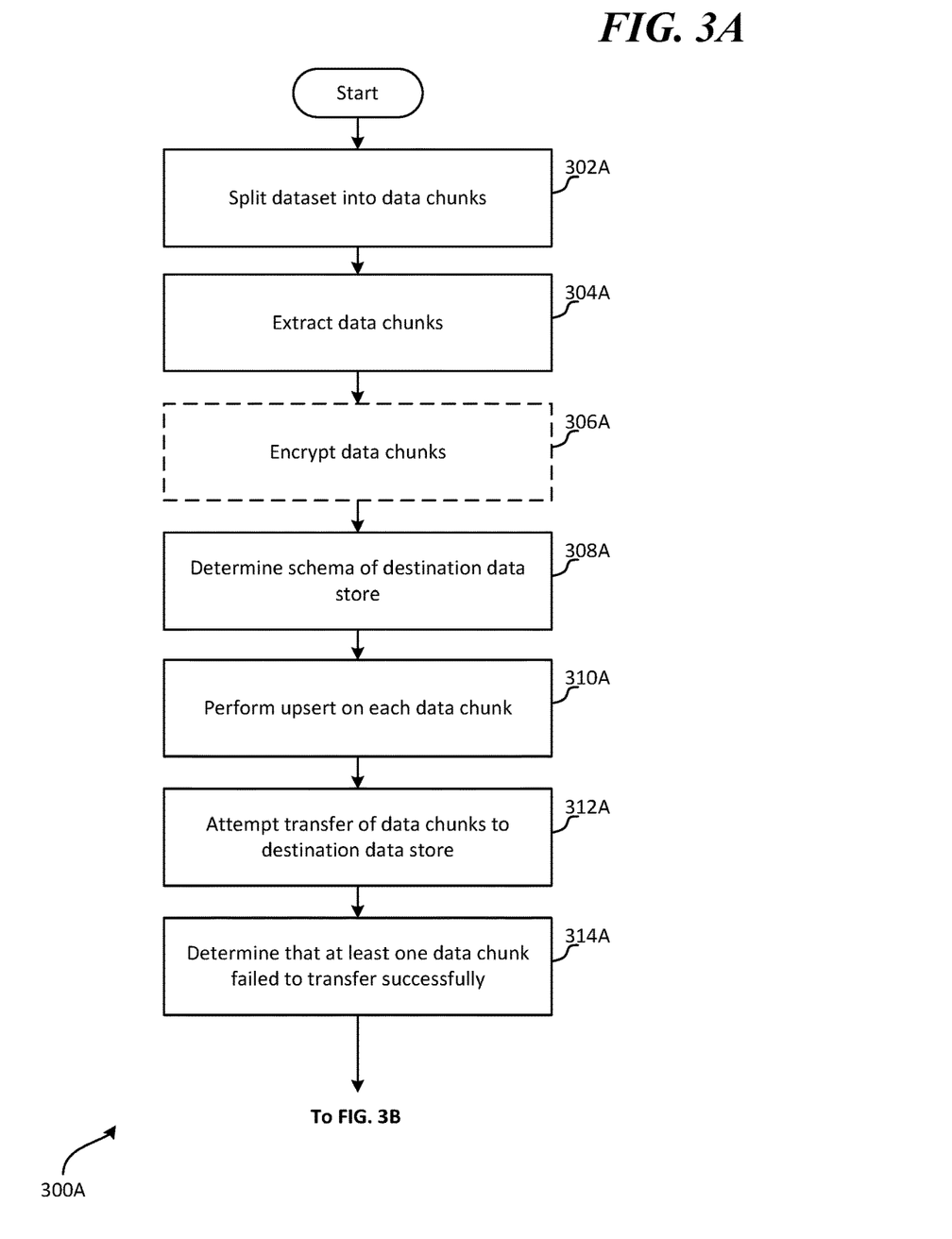
FIGS. 3A and 3B illustrate an exemplary method 300A and 300B for implementing an advanced retry mechanism for transfer of large datasets from a source data store to a destination data store.
Figure 3B:
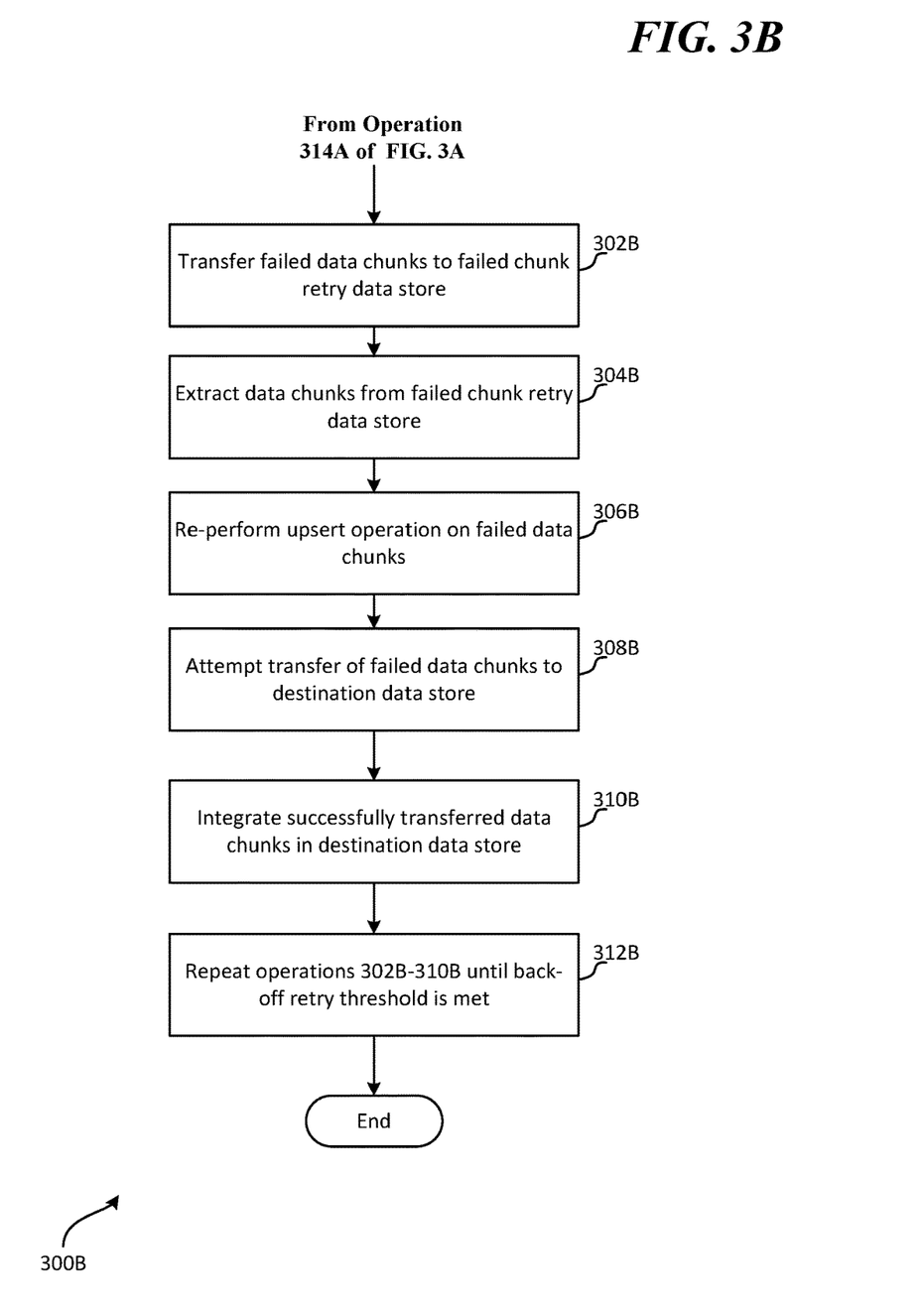

FIG. 3A and FIG. 3B illustrate an exemplary method 300A and 300B for implementing an advanced retry mechanism for transfer of large datasets from a source data store that stores files in a first format to a destination data store that requires the storage of data in a specified schema. The method begins at a start operation and flow moves to operation 302A where one or more datasets in a source data store are split into a plurality data chunks for transfer. From operation 302A flow continues to operation 304A where an individual extraction engine is assigned to each of the split data chunks (e.g., a different extraction engine is assigned to each of the data chunks split from the one or more datasets at operation 302A) and the data chunks are extracted from the source data store for transfer.

From operation 304A flow continues to operation 306A where an individual encryption engine is assigned to each of the extracted data chunks and each of the data chunks are optionally encrypted for transfer by their respective assigned encryption engines. From operation 306A flow moves to operation 308A where a determination is made as to the structured schema requirements of a destination data store to which the extracted data chunks are to be transferred. Moving to operation 310A an individual mapping engine is assigned to each of the extracted data chunks and one or more upsert operations are performed on each data chunk by their respective assigned mapping engines for conforming their format to a schema supported by a destination data store to which they are to be transferred.

From operation 310A flow continues to operation 312A where a first attempt to transfer each of the upserted data chunks to a destination data store is made. Continuing from operation 312A to operation 314A a determination is made that at least one data chunk failed to transfer successfully to the destination data store. From operation 314A flow continues to FIG. 3B and operation 302B where each of the data chunks that initially failed to transfer successfully to the destination data store (which may be derived from separate datasets) are transferred to a failed chunk retry data store. Alternatively, the failed data chunks may be marked as failed within the source data store and retry of those failed chunks may be executed from the source data store rather than the retry execution being accomplished through a separate failed chunk retry data store. According to examples, each of the initially failed data chunks may be encrypted or decrypted by an individually assigned encryption or decryption engine prior to being transferred to a failed chunk retry data store.

From operation 302B flow continues to operation 304B where one or more retry modules may be implemented and each of the initially failed data chunks are extracted from a failed chunk retry data store. According to examples, each of the initially failed data chunks may be encrypted or decrypted by an individually assigned encryption or decryption engine prior to a retry transfer attempt.

Moving to operation 304B flow continues to operation 306B where an individual mapping engine is assigned to each of the initially failed data chunks and one or more upsert operations are performed on each initially failed data chunk by their respective assigned mapping engines for conforming their format to a schema supported by a destination data store to which they are to be transferred. Continuing to operation 308B a first retry attempt to transfer each of the initially failed data chunks to the destination data store is made.

From operation 308B flow continues to operation 310B where data chunks that are successfully transferred to the destination data store during the first retry attempt are integrated with any data chunks that were successfully transferred to the destination data store during the initial transfer attempt. Flow then continues to operation 312B where operations 302B-310B are repeated until either all of the data chunks have been successfully transferred to the transfer data store or a back-off retry threshold number of retry attempts is exceeded based on a designated retry strategy.

Figure 4:
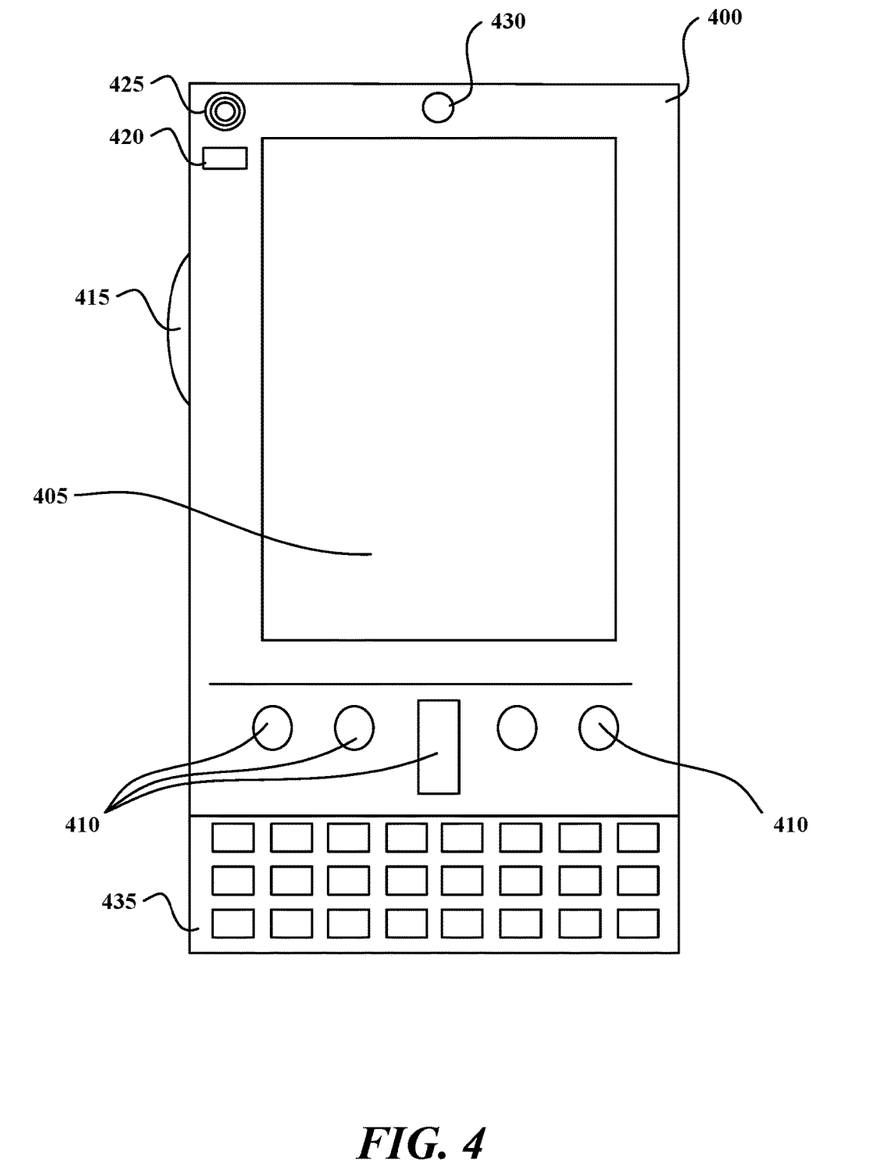
FIG. 4 illustrates a computing device for executing one or more aspects of the present disclosure.
Figure 5:
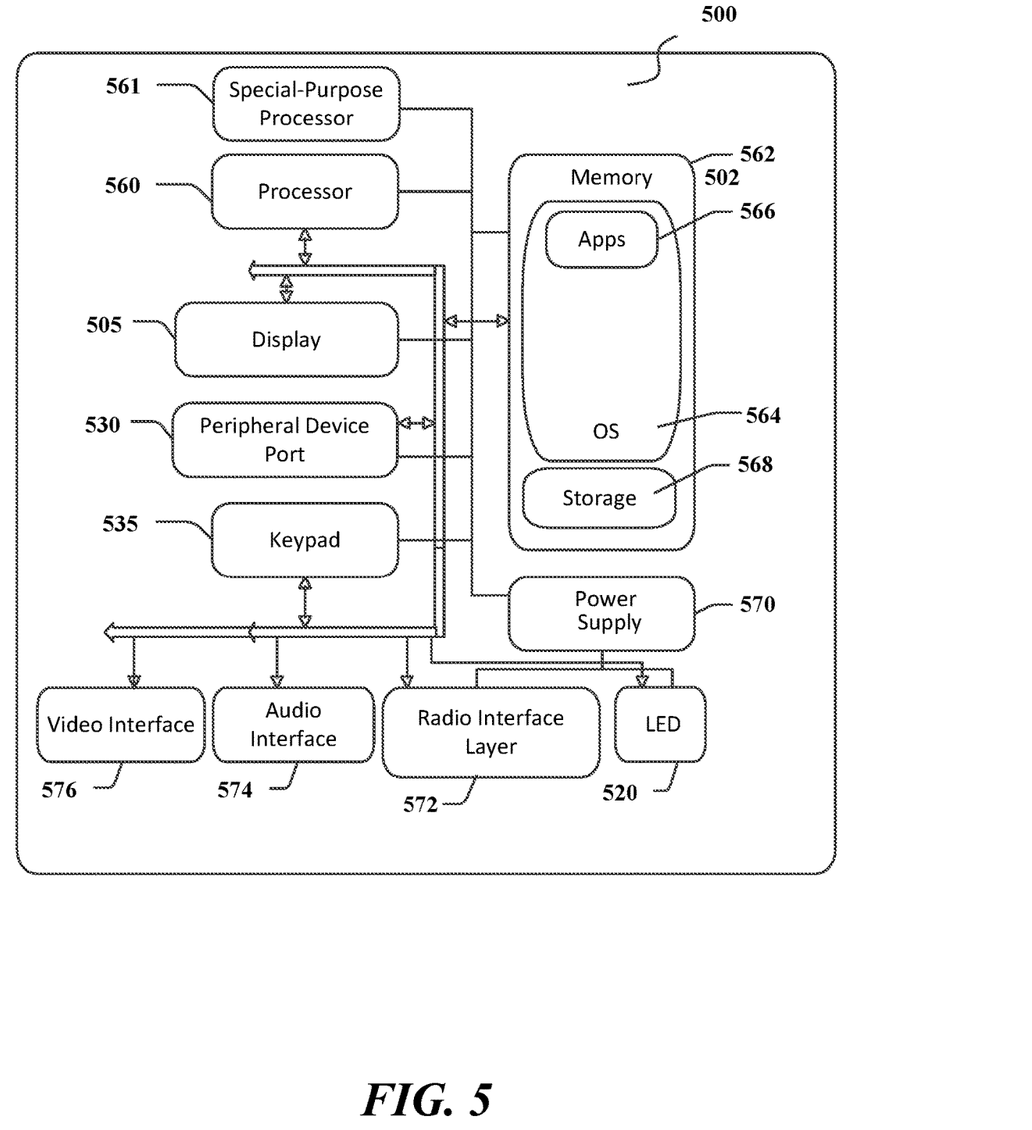
FIG. 5 is a simplified block diagram of a computing device with which aspects of the present disclosure may be practiced.

FIG. 4 and FIG. 5 illustrate computing device 400, for example, a mobile telephone, a smart phone, a tablet personal computer, a laptop computer, and the like, with which embodiments of the disclosure may be practiced. With reference to FIG. 4, an exemplary mobile computing device 400 for implementing the embodiments is illustrated. In a basic configuration, the mobile computing device 400 is a handheld computer having both input elements and output elements. The mobile computing device 400 typically includes a display 405 and one or more input buttons 410 that allow the user to enter information into the computing device 400. The display 405 of the mobile computing device 400 may also function as an input device (e.g., a touch screen display). If included, an optional side input element 415 allows further user input. The side input element 415 may be a rotary switch, a button, or any other type of manual input element.

In alternative embodiments, mobile computing device 400 may incorporate more or less input elements. For example, the display 405 may not be a touch screen in some embodiments. In yet another alternative embodiment, the mobile computing device 400 is a portable phone system, such as a cellular phone. The mobile computing device 400 may also include an optional keypad 435. Optional keypad 435 may be a physical keypad or a "soft" keypad generated on the touch screen display.

In various embodiments, the output elements include the display 405 for showing a graphical user interface (GUI), a visual indicator 420 (e.g., a light emitting diode) and/or an audio transducer 425 (e.g., a speaker). In some embodiments, the mobile computing device 400 incorporates a vibration transducer for providing the user with tactile feedback. In yet another embodiments, the mobile computing device 400 incorporates input and/or output ports, such as an audio input (e.g., a microphone jack), an audio output (e.g., a headphone jack), and a video output (e.g., a HDMI port) for sending signals to or receiving signals from an external device. In embodiments, the word processing application may be displayed on the display 405.

FIG. 5 is a block diagram illustrating the architecture of one embodiment of a mobile computing device. That is, the mobile computing device 500 can incorporate a system (i.e., an architecture) 502 to implement some aspects of the disclosure. In one aspect the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and a wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, diagramming applications, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like.

A synchronization application (not shown) also resides on the system 502 and is programmed to interact with a corresponding synchronization application resident on a host computer to keep the information stored in the non-volatile storage area 568 synchronized with corresponding information stored in the host computer. As should be appreciated, other applications may be loaded into the memory 562 and run on the mobile computing device 500, including steps and methods for transmitting a semi-structured dataset to a destination data store having requiring a structured format.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the functions of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 566 via the operating system 564, and vice versa. The radio 572 allows the system 502 to communicate with other computing devices such as over a network. The radio 572 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5 by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 502 may vary and may include more or fewer components than those described in FIG. 5. In some examples, interfacing between components of the system 502 may occur remotely, for example where components of system 502 may be spread across one or more devices of a distributed network. In examples, one or more data stores/storages or other memory are associated with system 502. For example, a component of system 502 may have one or more data storages/memories/stores associated therewith. Data associated with a component of system 502 may be stored thereon as well as processing operations/instructions executed by a component of system 502.

Figure 6:
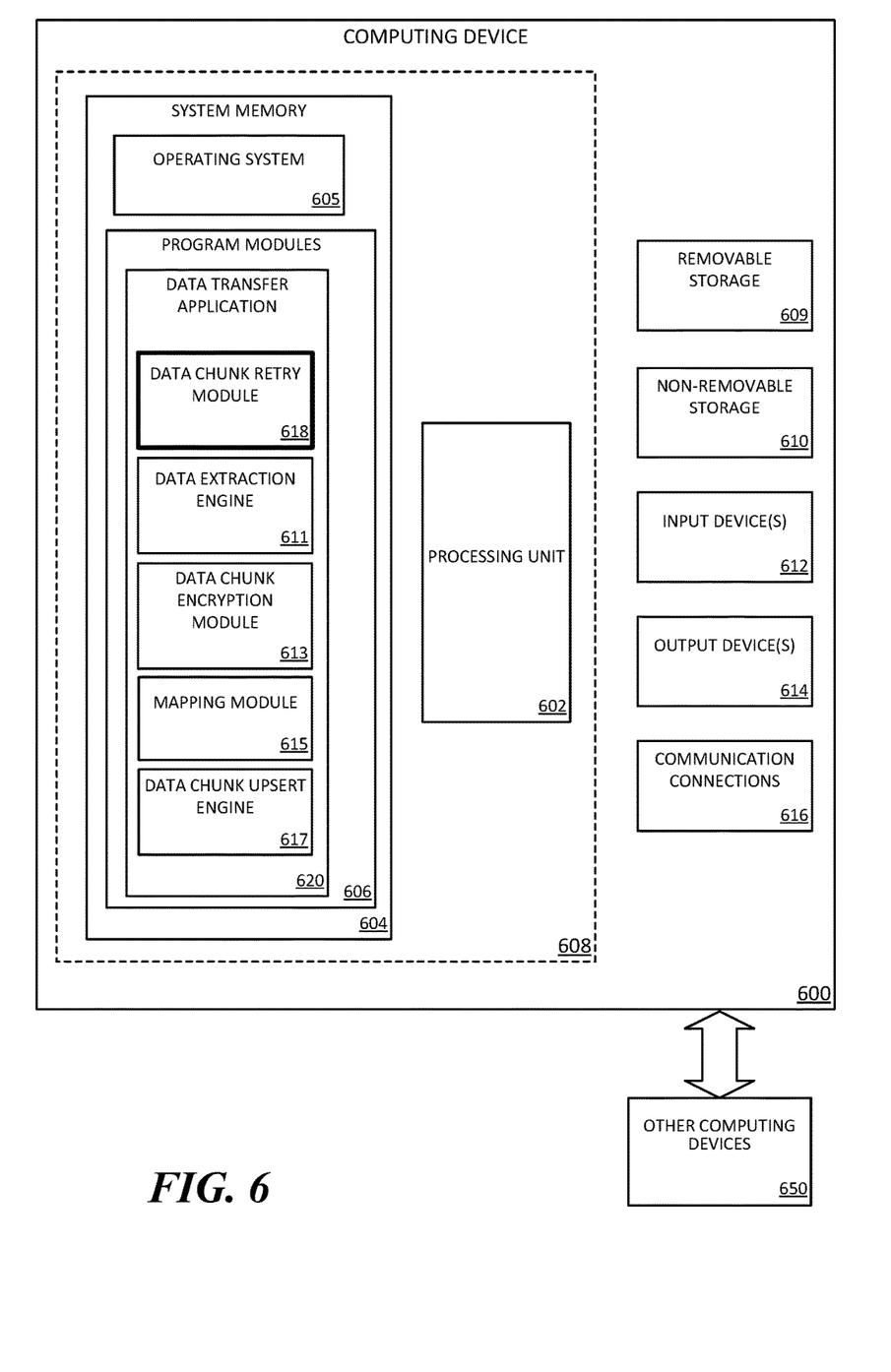
FIG. 6 is a block diagram illustrating physical components (e.g., hardware) of a computing device 1000 with which aspects of the present disclosure may be practiced.

FIG. 6 is a block diagram illustrating physical components (e.g., hardware) of a computing device 600 with which aspects of the disclosure may be practiced. The computing device components described below may have computer executable instructions for transmitting a dataset, including: receiving a plurality of data chunks, the plurality of data chunks received in a first format; performing at least one upsert operation on each of the plurality of data chunks, the at least one upsert operation comprising converting the first format to a schema compatible with a destination data store; executing a transfer of the upserted data chunks to the destination data store; determining that at least one of the upserted data chunks has failed to transfer to the destination data store; storing the at least one failed data chunk in a failed chunk retry data store; re-performing the at least one upsert operation on the at least one failed data chunk; and re-executing a transfer of the at least one failed data chunk to the destination data store, including computer executable instructions for data transfer application 620 that can be executed to employ the methods disclosed herein.

In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for data transfer application 620, such as one or more components in regards to FIG. 6 and, in particular, data chunk retry module 618 data extraction engine 611, data chunk encryption module 613, mapping module 615 and data chunk upsert engine 617.

The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., data transfer application 620) may perform processes including, but not limited to, the aspects, as described herein. Other program modules that may be used in accordance with aspects of the present disclosure.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on processing unit 602, program modules (e.g., applications, Input/Output (I/O) management, and other utilities) may perform processes including, but not limited to, one or more of the operational stages of the methods described herein.

Figure 7:
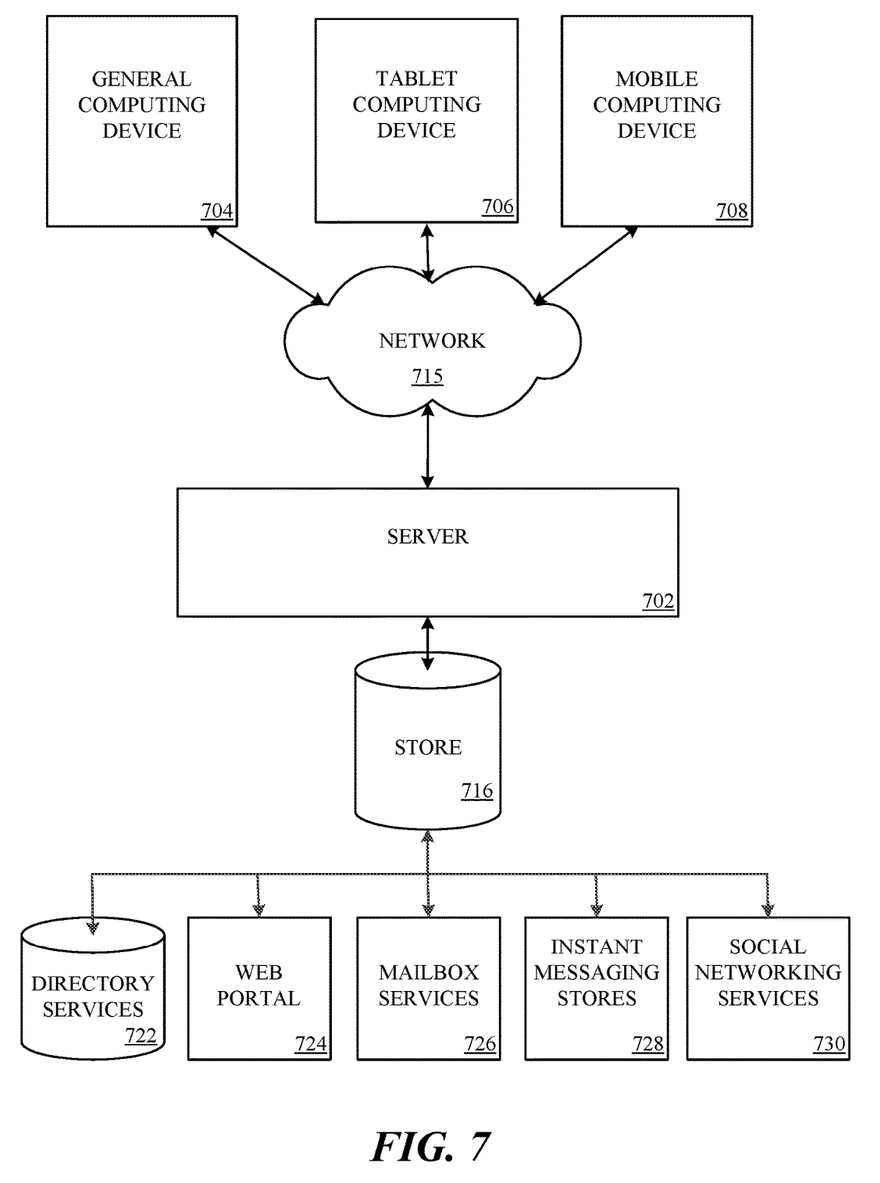
FIG. 7 is a schematic diagram illustrating an example distributed computing environment for providing an advanced retry mechanism for transfer of large datasets.

FIG. 7 illustrates one example of the architecture of a system for transmitting one or more datasets from a source data store to a destination data store as described above. Data from a semi-structured dataset may be accessed, interacted with, or edited in association with programming modules 606 and storage/memory which may be stored in different communication channels or other storage types. For example, various documents may be stored using a directory service 722, a web portal 724, a mailbox service 726, an instant messaging store 728, or a social networking site 730, application 706, an IO manager, other utilities and storage systems may use any of these types of systems or the like for enabling data utilization, as described herein. A server 702 may provide a storage system for use by a client operating on a general computing device 704 and mobile computing devices 706 through network 715. By way of example, network 715 may comprise the Internet or any other type of local or wide area network, and client nodes may be implemented as a computing device embodied in a personal computer, a tablet computing device 706, and/or by a mobile computing device 708 (e.g., mobile processing device). Any of these examples of the computing devices described herein may obtain content from the store 716.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for transmitting data from a source data store, comprising:
    receiving a plurality of data chunks, wherein the plurality of data chunks are received in a first format and are of a fixed size;
    performing at least one modification operation on each of the plurality of data chunks, the at least one modification operation comprising converting the first format to a second format compatible with a destination data store;
    executing a first attempt to transfer the modified data chunks to the destination data store;
    determining that at least one of the modified data chunks has failed to transfer to the destination data store;
    storing the at least one failed data chunk in a failed chunk retry data store;
    performing the at least one modification operation on the at least one failed data chunk; and
    executing a second attempt to transfer the at least one failed data chunk to the destination data store.

2. The method of claim 1, further comprising determining a schema of the second format for the destination data store.

3. The method of claim 2, wherein the at least one modification operation comprises modifying the format of each of the plurality of data chunks to conform to the second format for the destination data store.

4. The method of claim 1, wherein determining that at least one of the modified data chunks has failed to transfer to the destination data store comprises receiving an indication that a single record contained in the modified data chunks has failed to transfer.

5. The method of claim 1, wherein determining that at least one of the modified data chunks has failed to transfer to the destination data store comprises receiving an indication that at least one of the modified data chunks was impacted by at least one of: network weather, the destination data store being in a fail state, and the destination data store being in an update state.

6. The method of claim 1, further comprising:
    encrypting, upon determining that at least one of the modified data chunks has failed to transfer to the destination data store, the at least one failed data chunk for storage in the failed chunk retry data store.

7. The method of claim 1, further comprising:
    encrypting, upon performing the at least one modification operation on the at least one failed data chunk, the at least one failed data chunk for transfer to the destination data store.

8. The method of claim 1, further comprising:
  determining whether the at least one failed data chunk has exceeded a back-off retry attempt threshold based on a number of transfer attempts to the destination data store; and
  transferring, upon determining that the at least one failed data chunk has exceeded the back-off retry attempt threshold, the at least one failed data chunk to a permanently failed container.

9. The method of claim 8, wherein each subsequent attempt to transfer the at least one failed data chunk is linearly scaled based on a linear temporal scale.

10. The method of claim 8, wherein each subsequent attempt to transfer the at least one failed data chunk is exponentially scaled temporally.

11. The method of claim 8, wherein a plurality of mapping engines are assigned for transferring the plurality of data chunks to the destination data store, each of the plurality of mapping engines assigned for the transfer of a separate data chunk of the plurality of data chunks.

12. The method of claim 11, further comprising:
  associating, upon determining that at least one of the modified data chunks has failed to transfer to the destination data store, metadata with the at least one failed data chunk indicating which of the plurality of mapping engines was assigned to the at least one failed data chunk.

13. The method of claim 1, wherein the failed chunk retry data store is the source data store.

14. A computer-readable storage device comprising executable instructions that, when executed by a processor, assist with transmitting data from a source data store, the computer-readable storage device including instructions executable by the processor for:
  receiving a plurality of data chunks, wherein the plurality of data chunks are received in a first format and are of a fixed size;
  performing at least one modification operation on each of the plurality of data chunks, the at least one modification operation comprising converting the first format to a second format compatible with a destination data store;
  executing a first attempt to transfer the modified data chunks to the destination data store;
  determining that at least one of the modified data chunks has failed to transfer to the destination data store;
  storing the at least one failed data chunk in a failed chunk retry data store;
  performing the at least one modification operation on the at least one failed data chunk; and
  executing a second attempt to transfer the at least one failed data chunk to the destination data store.

15. The computer-readable storage device of claim 14, wherein the instructions are further executable by the processor for determining a schema for the second format for the destination data store.

16. The computer-readable storage device of claim 15, wherein the at least one modification operation comprises modifying the format of each of the plurality of data chunks to conform to the second format for the destination data store.

17. A system for transmitting data from a source data store, comprising:
  a memory for storing executable program code; and
  a processor, functionally coupled to the memory, the processor being responsive to computer-executable instructions contained in the program code and operative to:
  receive a plurality of data chunks, wherein the plurality of data chunks are received in a first format and are of a fixed size;
  perform at least one modification operation on each of the plurality of data chunks, the at least one modification operation comprising converting the first format to a second format compatible with a destination data store;
  execute a first attempt to transfer the modified data chunks to the destination data store;
  determine that at least one of the modified data chunks has failed to transfer to the destination data store;
  store the at least one failed data chunk in a failed chunk retry data store;
  perform the at least one modification operation on the at least one failed data chunk; and
  execute a second attempt to transfer the at least one failed data chunk to the destination data store.

18. The system of claim 17, wherein the processor is further responsive to the computer-executable instructions and operative to encrypt, upon determining that at least one of the modified data chunks has failed to transfer to the destination data store, the at least one failed data chunk for storage in the failed chunk retry data store.

19. The system of claim 17, wherein the processor is further responsive to the computer executable instructions and operative to:
  determine whether the at least one failed data chunk has exceeded a back-off retry attempt threshold based on a number of transfer attempts to the destination data store; and
  transfer, upon determining that the at least one failed data chunk has exceeded the back-off retry attempt threshold, the at least one failed data chunk to a permanently failed container.

20. The method of claim 1, wherein the first format corresponds to a structured format and the second format corresponds to at least one of a non-structured format or a semi-structured format.

* * * * *